US011031728B2

(12) United States Patent
Louis et al.

(10) Patent No.: US 11,031,728 B2
(45) Date of Patent: Jun. 8, 2021

(54) ELECTRICAL CONNECTOR

(71) Applicant: Black & Decker Inc., New Britain, CT (US)

(72) Inventors: Ralphy A. Louis, York, PA (US); Kevin M. Alston, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 15/820,570

(22) Filed: Nov. 22, 2017

(65) Prior Publication Data

US 2018/0145445 A1    May 24, 2018

Related U.S. Application Data

(60) Provisional application No. 62/425,731, filed on Nov. 23, 2016.

(51) Int. Cl.
| | |
|---|---|
| *H01R 13/58* | (2006.01) |
| *H01R 4/02* | (2006.01) |
| *H01M 50/502* | (2021.01) |

(52) U.S. Cl.
CPC .......... *H01R 13/58* (2013.01); *H01M 50/502* (2021.01); *H01R 4/027* (2013.01); *H01M 2220/30* (2013.01)

(58) Field of Classification Search
CPC ............... H01M 2/0202; H01M 2/206; H01M 2220/20; H01M 2/202; H01M 20/502; H01M 2220/30; H01R 11/288; H01R 11/11; H01R 11/281; H01R 13/2428; H01R 11/289; H01R 11/12; H01R 12/707; H01R 4/027; H01R 13/58; H01R 4/023; H01R 25/16; H01R 25/161
See application file for complete search history.

(56) References Cited

U.S. PATENT DOCUMENTS

| | | | | |
|---|---|---|---|---|
| 2,125,485 | A * | 8/1938 | Caldwell | H01R 13/58 |
| | | | | 439/469 |
| 3,038,958 | A * | 6/1962 | Swengel | H01R 9/20 |
| | | | | 174/94 R |
| 8,114,540 | B2 * | 2/2012 | Trester | H01M 10/48 |
| | | | | 174/68.2 |
| 8,647,764 | B2 * | 2/2014 | Naito | H01M 2/06 |
| | | | | 429/100 |
| 9,105,912 | B2 * | 8/2015 | Zhao | H01M 2/305 |
| 10,330,536 | B2 * | 6/2019 | Okamoto | G01K 7/22 |
| 2010/0190050 | A1 * | 7/2010 | Ochi | H01M 2/24 |
| | | | | 429/160 |

(Continued)

*Primary Examiner* — Renee S Luebke
*Assistant Examiner* — Paul D Baillargeon
(74) *Attorney, Agent, or Firm* — Michael Aronoff

(57) ABSTRACT

The present disclosure presents an electrical connector comprising a wire coupling portion, the wire coupling portion including a generally flat, plateau portion wherein the plateau portion includes a trough. The electrical connector wherein the trough is generally semi-cylindrical. The electrical connector further comprises an overlap portion that is positioned generally parallel to the plateau portion. The electrical connector wherein the overlap portion is positioned generally adjacent to an open side of the trough. The electrical connector further comprising an electrical device coupling portion at an end of the electrical connector opposite to the wire coupling portion.

5 Claims, 13 Drawing Sheets

(56) References Cited

U.S. PATENT DOCUMENTS

| | | | |
|---|---|---|---|
| 2011/0308856 A1* | 12/2011 | Park | H01M 2/20 174/84 R |
| 2016/0133908 A1* | 5/2016 | Zhao | H01M 10/425 429/90 |
| 2017/0141483 A1* | 5/2017 | Kunimi | H01R 43/02 |

* cited by examiner

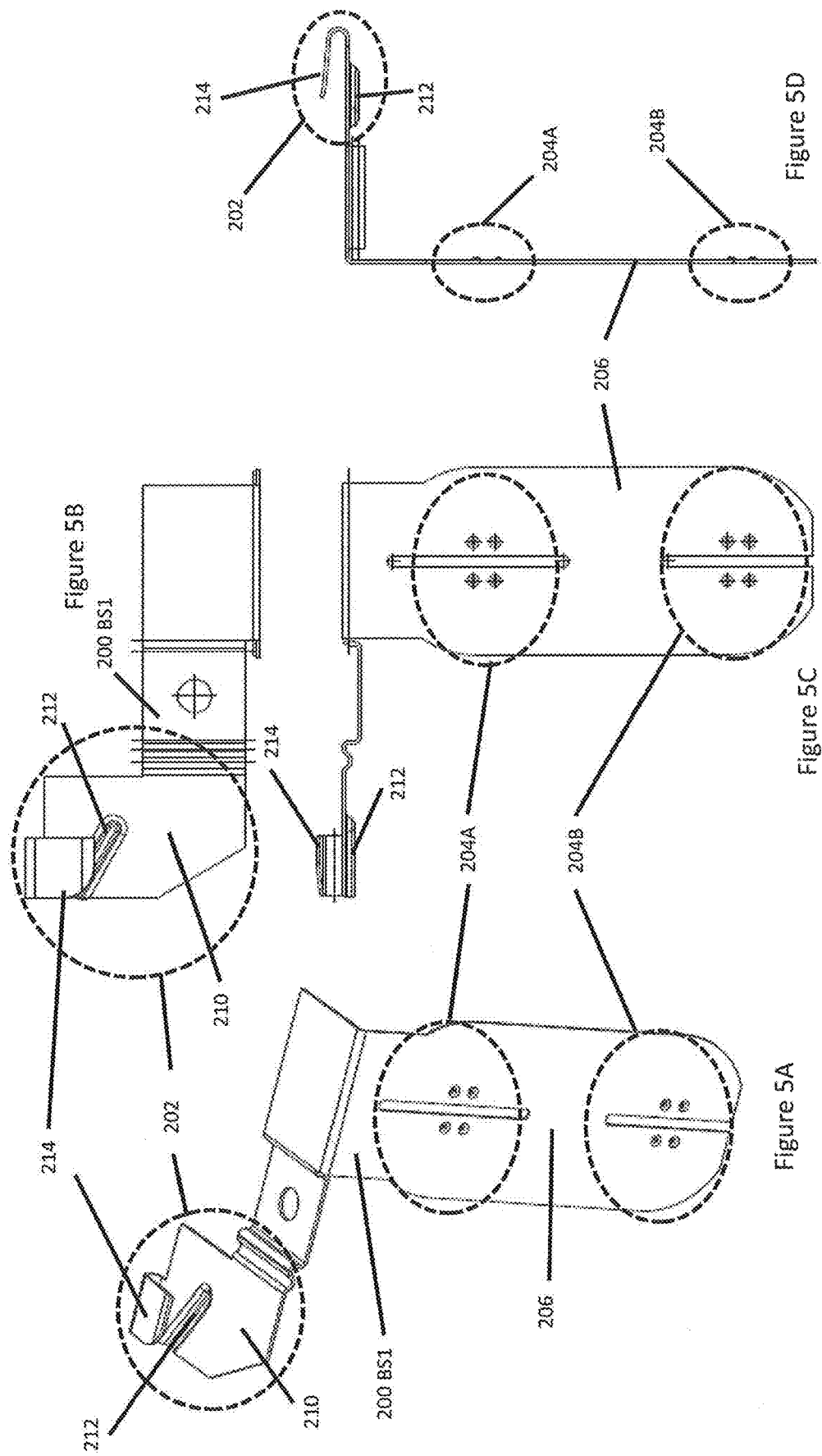

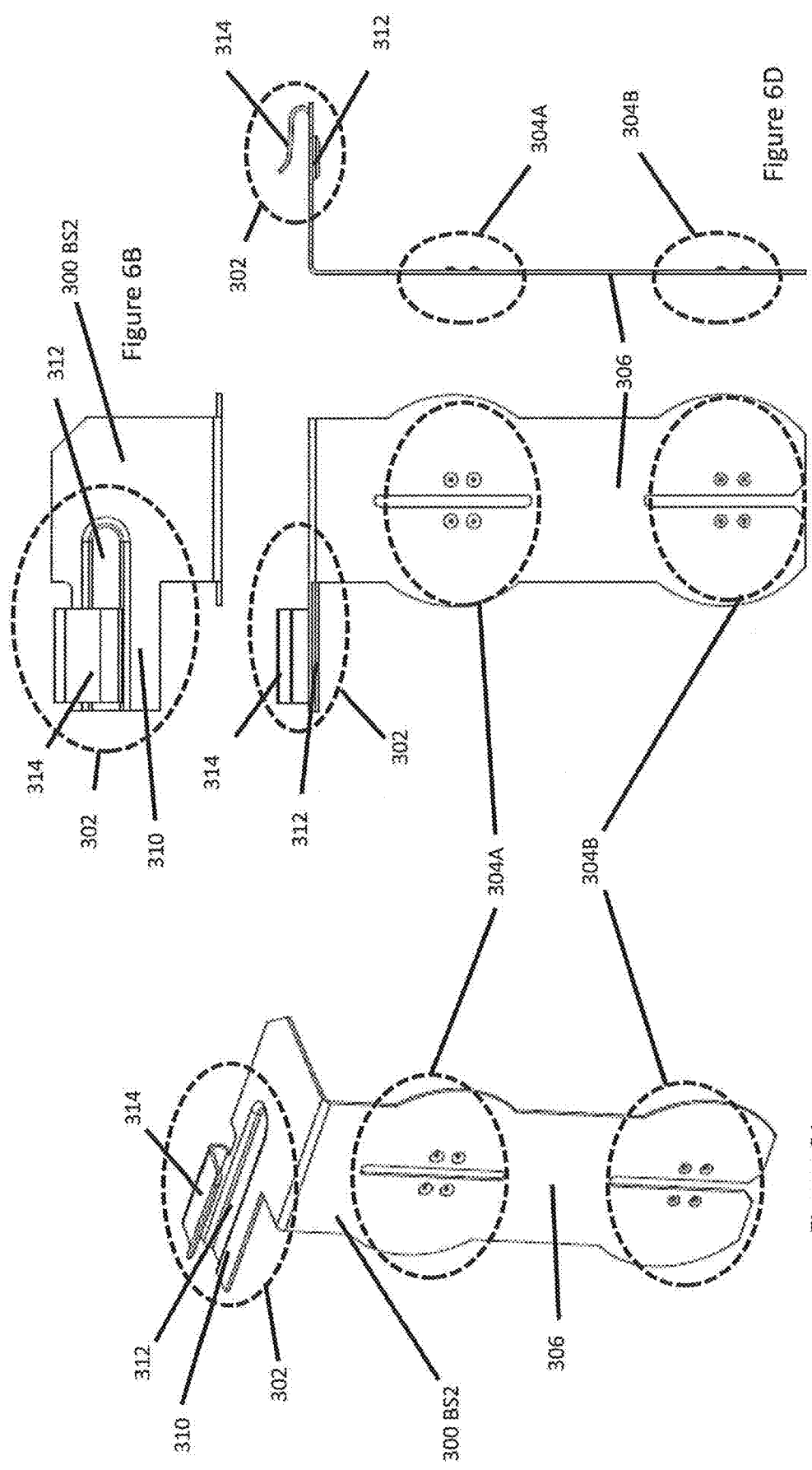

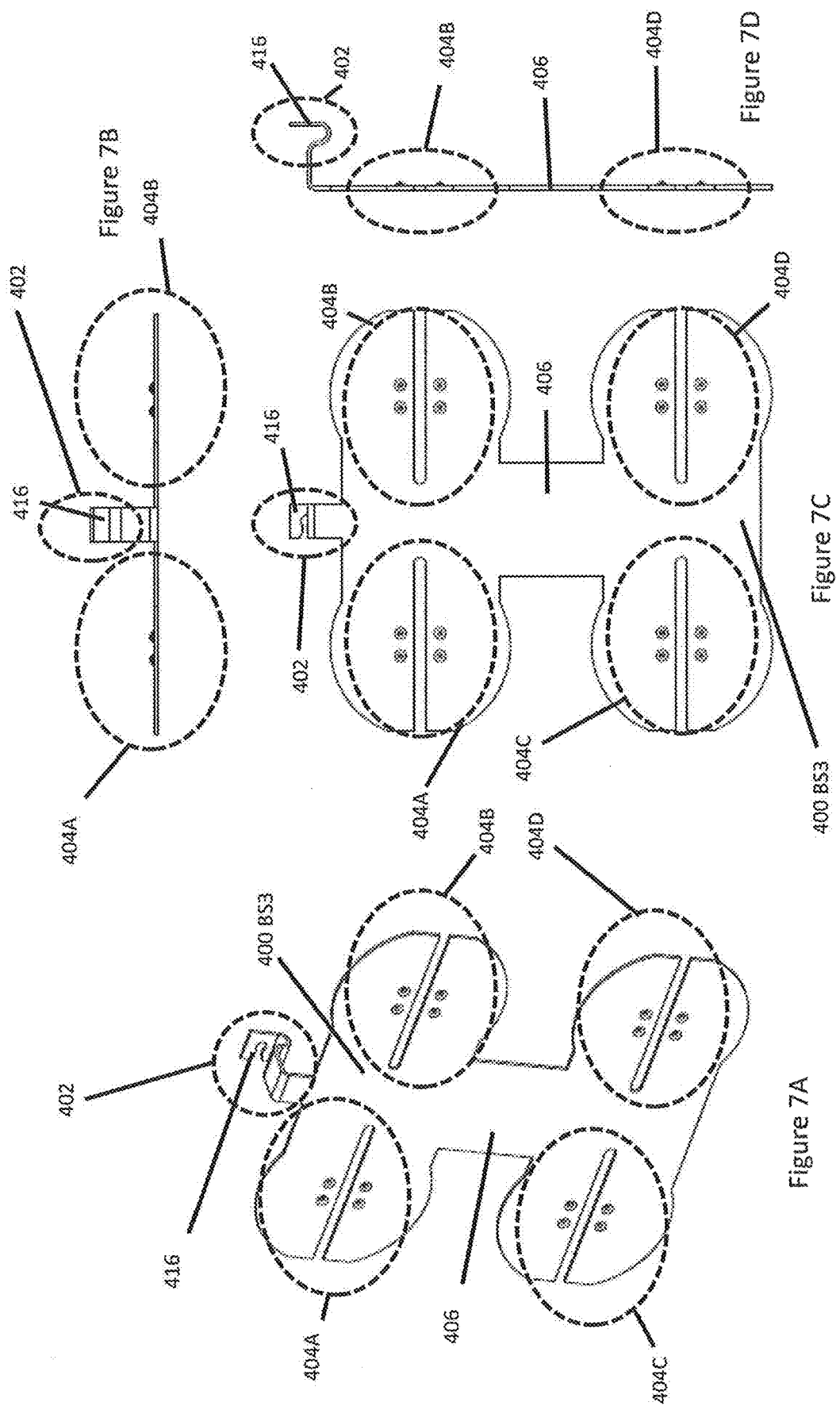

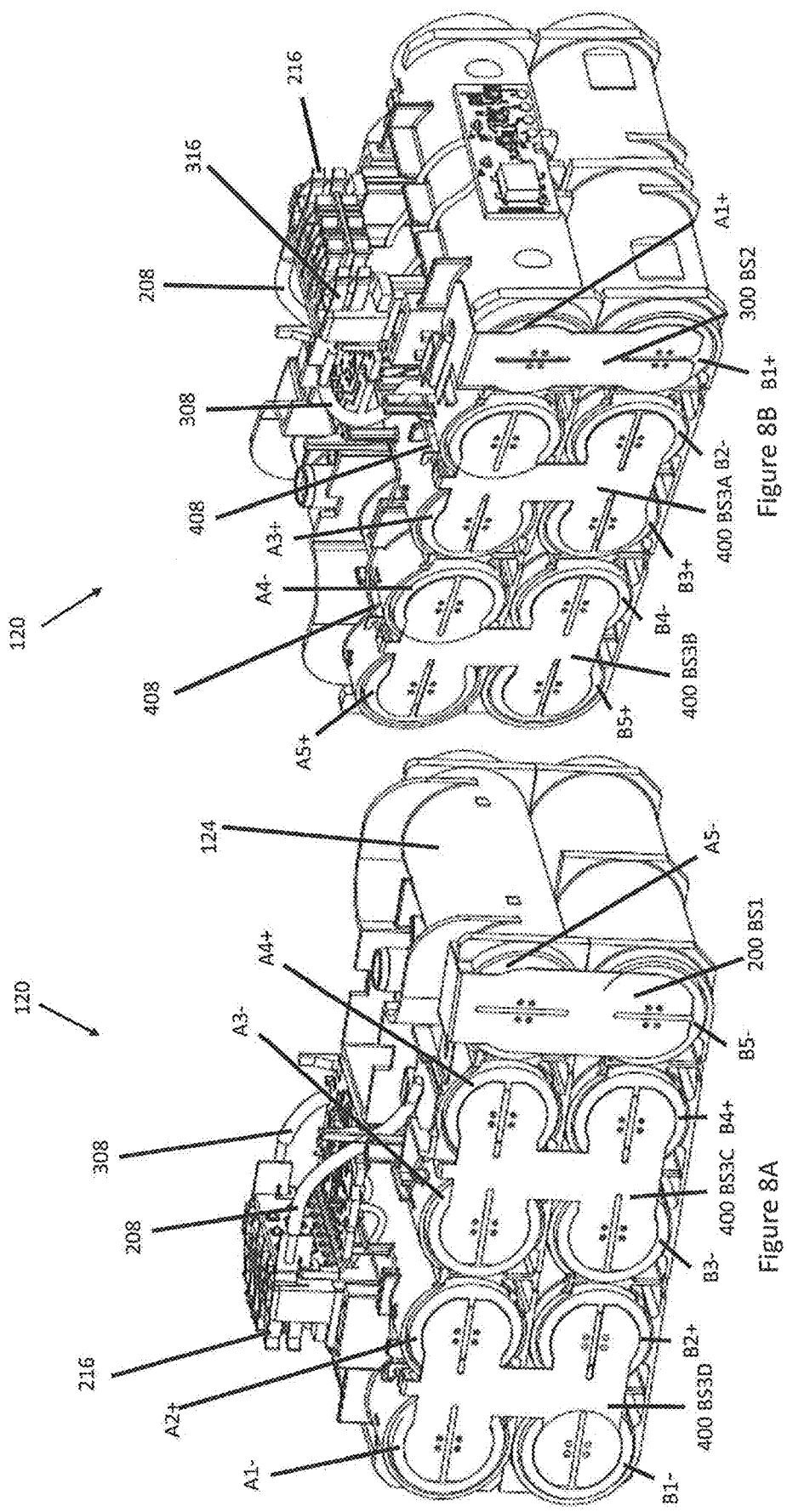

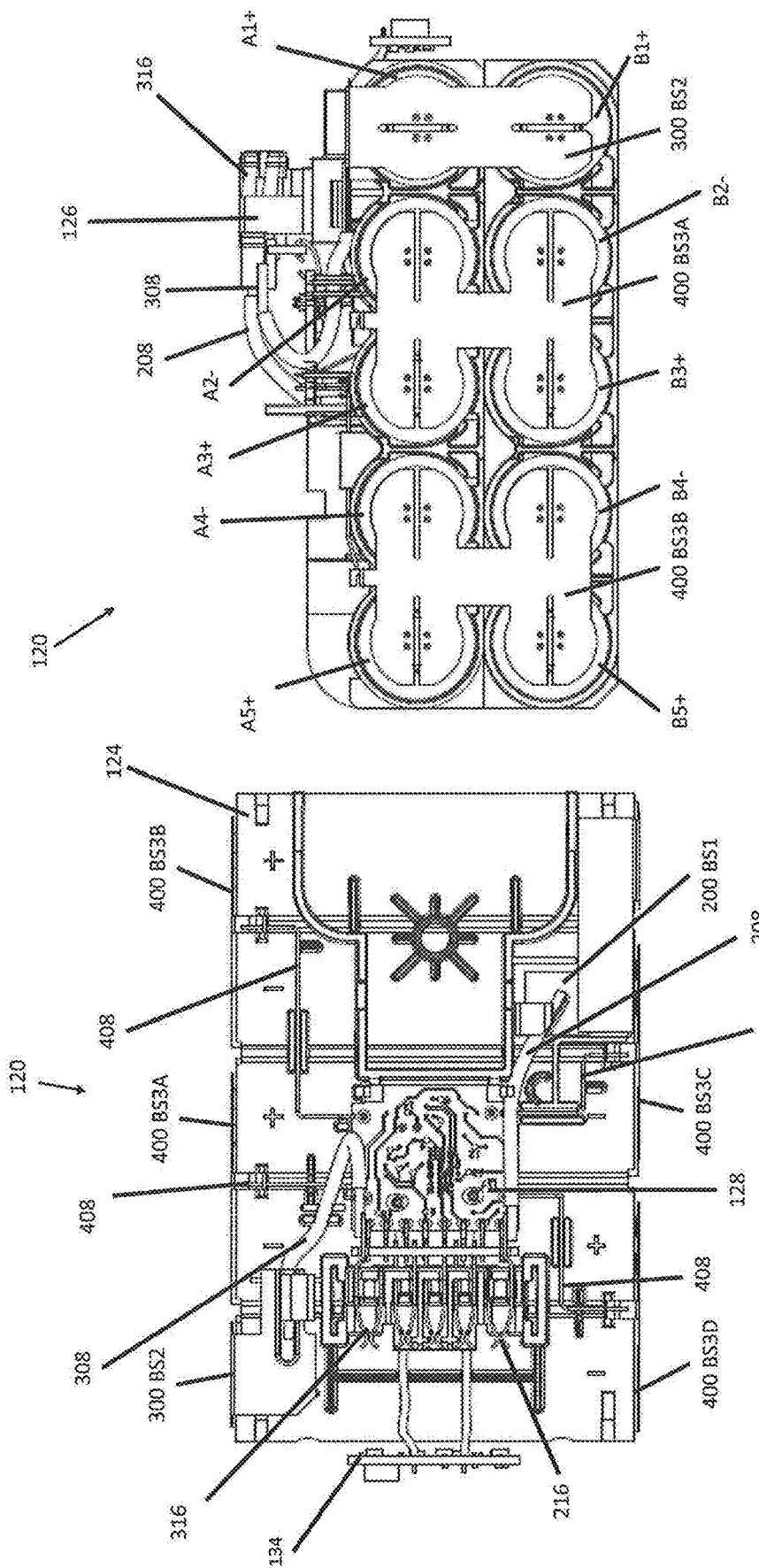

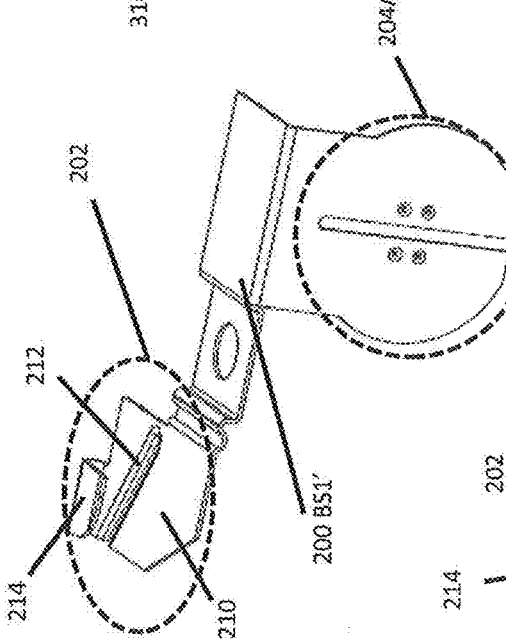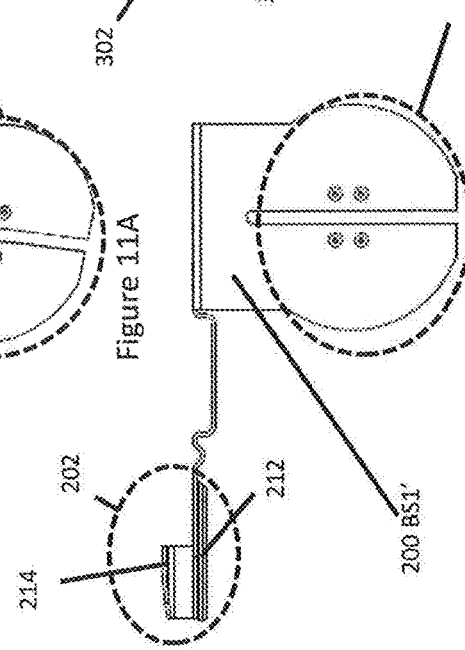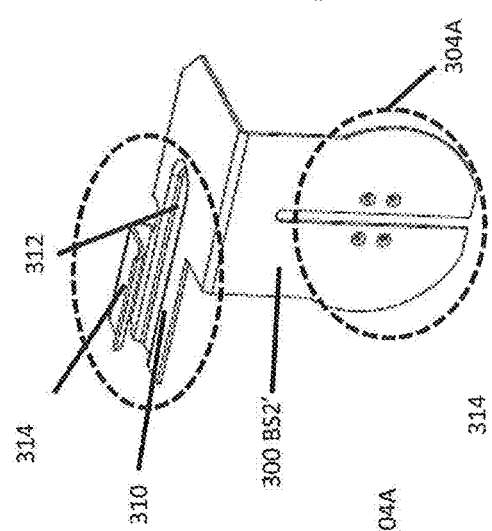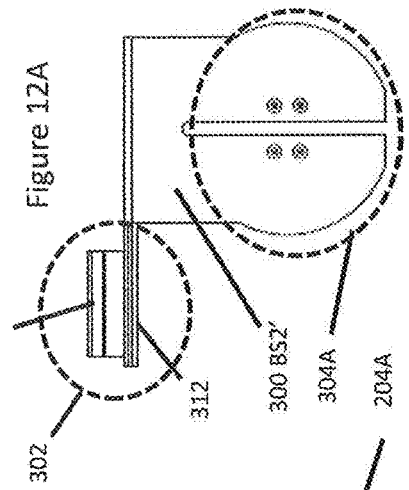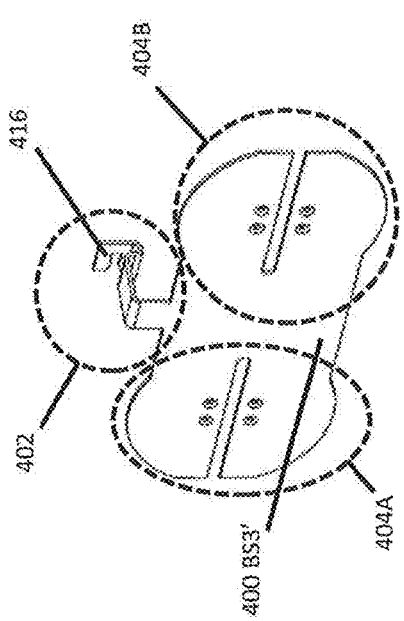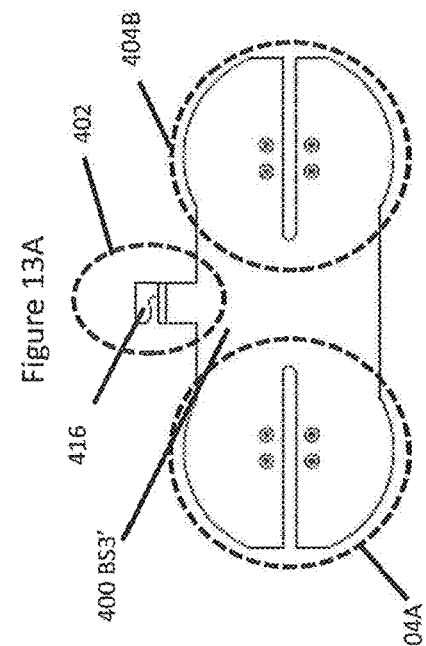
Figure 11A
Figure 11B
Figure 12A
Figure 12B
Figure 13A
Figure 13B

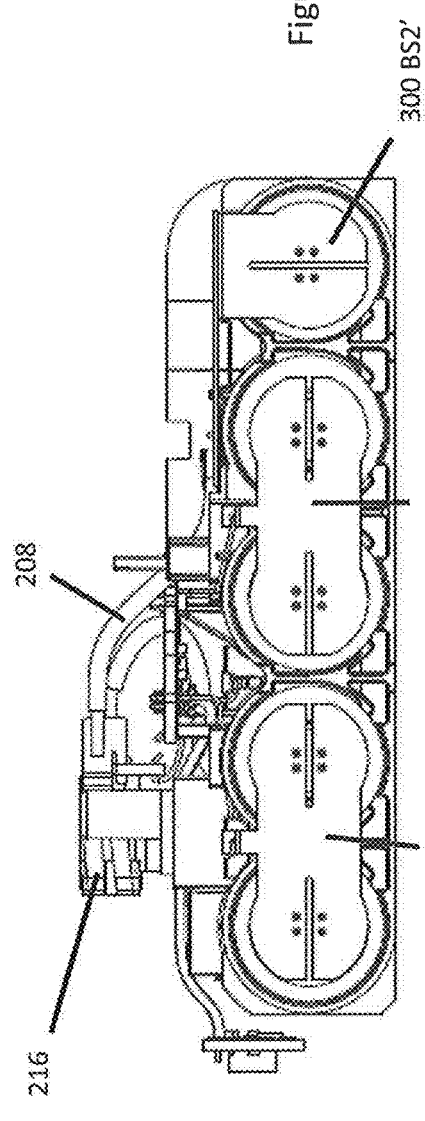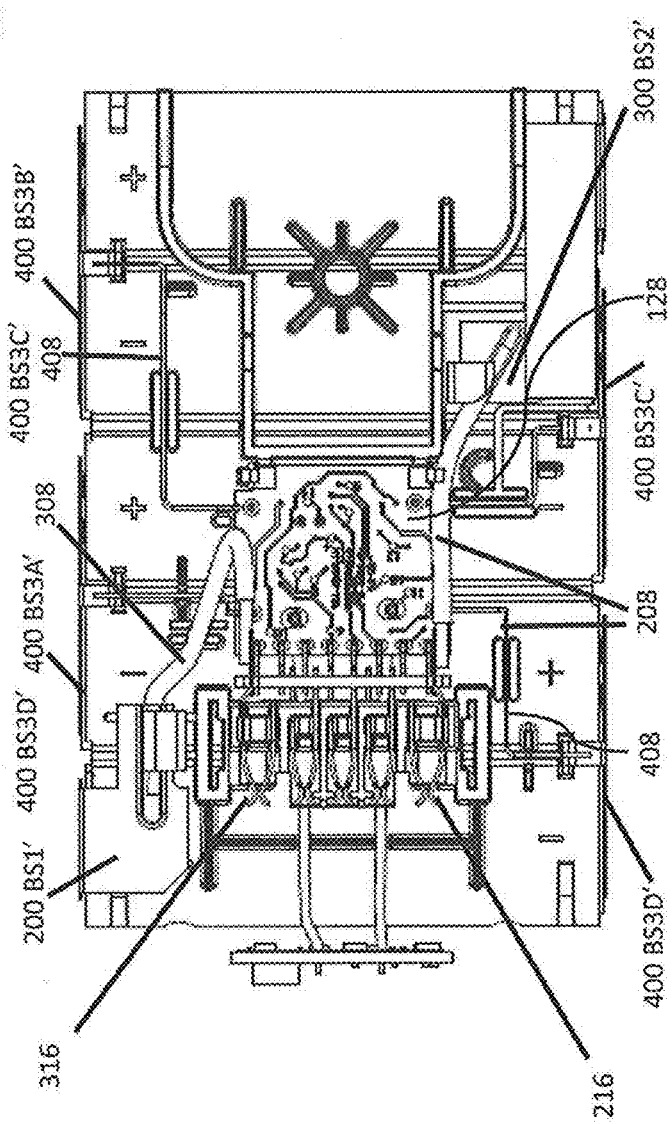

ELECTRICAL CONNECTOR

RELATED APPLICATIONS

This application claims priority under 35 U.S.C. § 119(e) to U.S. Provisional Patent Application No. 62/425,731, filed Nov. 23, 2017, titled "Electrical Connector."

TECHNICAL FIELD

This application relates to an electrical connector for a battery pack and a method for assembly a battery pack including an electrical connector. In one implementation, the electrical connector includes a cell coupling portion for coupling the connector to a battery cell and a wire coupling portion for coupling the connector to an electrical wire.

BACKGROUND

Cordless power tools, for example circular saws and drills (such as those manufactured by the DeWalt Power Tool Company) rely on removable, rechargeable battery packs, similar to an exemplary battery pack 100 illustrated in FIGS. 1 and 2 to provide power for operation. The battery pack 100 comprises a housing 102. The housing 102 includes a mechanical interface 104 for mating and coupling with the power tool. In this example, the mechanical interface 104 includes a rail and groove system that slides into engagement with a corresponding rail and groove system in the power tool. The battery pack 100 also includes a latch 106 that is received in a tool catch (recess) to fix the battery pack 100 to the tool. The housing 102 also includes a plurality of slots that provide access through the housing 102 to a plurality of terminals 108 of the battery pack 100. In the exemplary battery pack 100, the housing 102 includes a top portion/upper housing 110 and a bottom portion/lower housing 112 that are coupled together to create an interior cavity for housing various components of the battery pack 100. The top portion 110 and the bottom portion 112 are held together by a plurality of fasteners 114. The battery pack 100 also includes a state of charge (SOC) display/indicator 116.

The battery pack internal components include a spring 118 operationally associated with the latch 106 and what is referred to as a core pack 120. The core pack 120 includes a plurality of battery cells 122, a battery cell holder 124 that maintains the battery cells 122 in a fixed position relative to each other and the housing 102, a terminal block assembly 126, a printed circuit board (PCB) 128 and various components mounted to the PCB 128, a plurality of battery straps 130, a plurality of lead wires 132 coupling the battery straps 130 to the terminals 108 or the PCB 128, and a SOC subassembly 134.

The terminal block assembly 126 includes a plurality of terminals 108 (including a subset of power terminals 108A for providing power from the battery pack 100 to the power tool or receiving power from a battery charger and a subset of data/signal terminals 108B for providing data to and/or receiving data from the power tool or battery charger) and a terminal block 136 that maintains the terminals 108 in a fixed position relative to each other and the housing 102. The PCB 128 may include various components for monitoring and controlling the operation and status of the battery pack 100 and the battery cells 122. There are various connections between the PCB 128 and the terminals 108. The battery straps 130 may couple individual battery cells 122 to each other (to either connect the cells in a series configuration or in a parallel configuration) or may couple a cell 122 to a power terminal 108A via a lead wire 132 or may couple a node between individual cells 122 to the PCB 128 via a lead wire 132. The SOC subassembly 134 may include a PCB, a plurality of LEDs, an actuator button and a set of lead wires coupled to the PCB 128.

In an exemplary embodiment, the core pack 120 is manufactured on an assembly line. The battery cells 122 are loaded into the cell holder 124, the populated PCB 128 is attached to the cell holder 124, and the terminal block assembly 126 is attached to the cell holder 124. As illustrated in FIG. 2, the exemplary battery pack 100 includes ten (10) battery cells 122. Specifically, the battery pack 100 includes a first string (set) A of five (5) cells A1, A2, A3, A4, A5 and a second string (set) B of five (5) cells B1, B2, B3, B4, B5. Each battery cell 122 includes an anode (+) terminal and a cathode (−) terminal. The battery cells 122 of each string are positioned in the same plane with their longitudinal axes parallel. Furthermore, the battery cells 122 are positioned such that within each string the battery cells 122 are connected in series and the two strings are connected in parallel. The battery straps 130 are placed on the cell holder 124 in an appropriate position to electrically couple the battery cells 122 to connect them as noted above and/or to couple a battery cell 122 to a terminal 108 and/or the PCB 128.

The core pack 120 is then placed on an assembly line to solder the lead wires 132 to the battery straps 130. As illustrated in FIG. 3, in an exemplary conventional battery pack 100, the battery strap 130 may be manufactured and formed by stamping the appropriately shaped piece of metal and folding the metal into the appropriate configuration. The illustrated battery strap 130 is a simple piece of metal, generally rectangular, that is bent at approximately ninety degrees at a central location of the part. This provides a battery cell coupling portion for coupling to the battery cell 122 and a wire coupling portion for coupling to the lead wire 132. As noted in FIG. 3 and FIG. 4A, the lead wire 132 is place on or very near the wire coupling portion of the battery strap 130. As illustrated in FIG. 4B, when the core pack 120 is placed on the assembly line it is placed in a fixture or jig 138. The fixture 138 includes a fixing element that presses the lead wire 132 onto the wire coupling portion of the battery strap 130. As illustrated, it is common for the lead wire 132 to curl away from the coupling portion of the battery strap 130 when the fixing element engages the lead wire 132. Thereafter, a soldering device solders the lead wire to the wire coupling portion of the battery strap. As illustrated in FIG. 4C, due to the curling of the lead wire 132, the resulting solder 140 may leave a less than satisfactory connection between the lead wire 132 and the battery strap 130. This may result in the lead wire 132 coming loose from the battery strap 130 at some later point in the assembly process, and/or a less than satisfactory electrical connection between the lead wire 132 and the battery strap 130. Alternatively, it is possible that during operation of the battery pack 100 when a significant amount of current is drawn through the lead wire 132 and battery strap 130, the solder material 140 may begin to liquefy. If this occurs and there is not a satisfactory connection between the lead wire 132 and the battery strap 130, the lead wire 132 may pull away from the battery strap 130 resulting in an open circuit and faulty battery pack 100.

As such, what is needed is a battery strap 130 that provides a better connection with the lead wire 132.

SUMMARY

An aspect of the present invention includes a battery strap for coupling a battery cell to a battery pack terminal wherein the battery strap includes a lead wire connecting portion including plateau portion having a trough formed therein and configured to receive a lead wire and/or an overlap portion (also referred to as an overlap member) adjacent to the plateau portion and forming a space therebetween to receive a lead wire.

Another aspect of the present invention includes a method of assembling a battery pack comprising providing a plurality of battery cells, providing at least one battery pack terminal, providing at least one battery strap, providing at least one lead wire coupling the at least one battery pack terminal and one of the plurality of battery cells, wherein the at least one battery strap includes in lead wire coupling portion having a plateau region, the plateau region including a trough formed therein and configured to receive one end of the lead wire, and placing the one of the lead wire in the trough and soldering the lead wire to the battery strap in the trough.

Implementations of this aspect may include one or more of the following features.

Advantages may include one or more of the following. A lead wire coupling a battery strap to a battery pack terminal or to a printed circuit board location is more easily coupled to the battery strap. The solder connection between the lead wire and the battery strap is more stable and provides a better connection between the lead wire and the battery strap. The better connection provides for improved electrical current flow between the battery strap and the lead wire. Furthermore, during use of the battery pack 100 if the solder coupling the lead wire to the battery strap heats up to the point of beginning to liquefy, the lead wire is more likely to maintain its position relative to the battery strap.

These and other advantages and features will be apparent from the description and the drawings.

BRIEF DESCRIPTION OF THE DRAWINGS

FIG. 5A is a perspective view, 5B is a top view, 5C is a front view, and 5D is a side view of a first exemplary embodiment of a battery strap of the present disclosure.

FIG. 6A is a perspective view, 6B is a top view, 6C is a front view and 6D is a side view of a second exemplary embodiment of a battery strap of the present disclosure.

FIG. 7A perspective view, 7B is a top view, 7C is a front view, and 7D is a side view of a third exemplary embodiment of a battery strap of the present disclosure.

FIGS. 8A and 8B illustrate a first exemplary core pack of the battery pack of FIG. 1 including the first, second and third exemplary battery straps.

FIG. 9A is a top view of the core pack of FIG. 8A and FIG. 9B is a side view of the core pack of FIG. 8B.

FIGS. 11A and 11B illustrate a fourth exemplary embodiment of a battery strap of the present disclosure.

FIGS. 12A and 12B illustrate a fifth exemplary embodiment of a battery strap of the present disclosure.

FIGS. 13A and 13B illustrate a sixth exemplary embodiment of a battery strap of the present disclosure

FIG. 15A is a side view of the core pack of FIG. 14A and FIG. 15B is a top view of the core pack of FIG. 14A.

DETAILED DESCRIPTION

Figure 1:
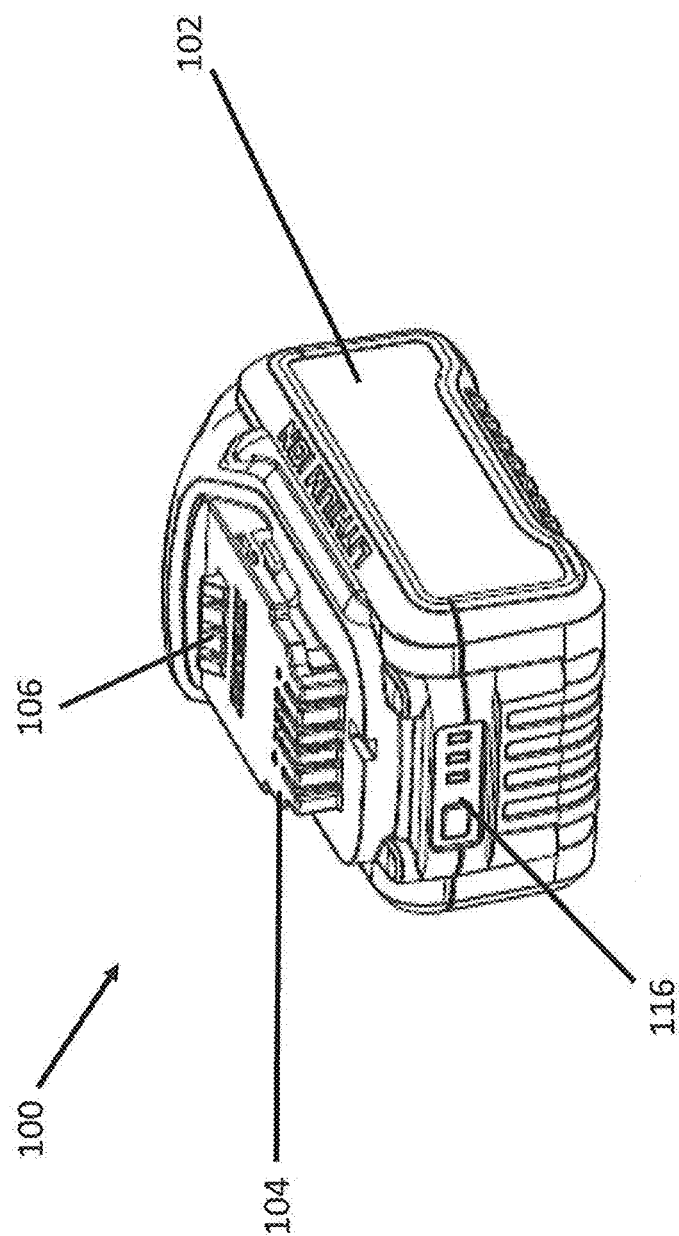
FIG. 1 is a perspective view of an exemplary battery pack of the present disclosure.
Figure 2:
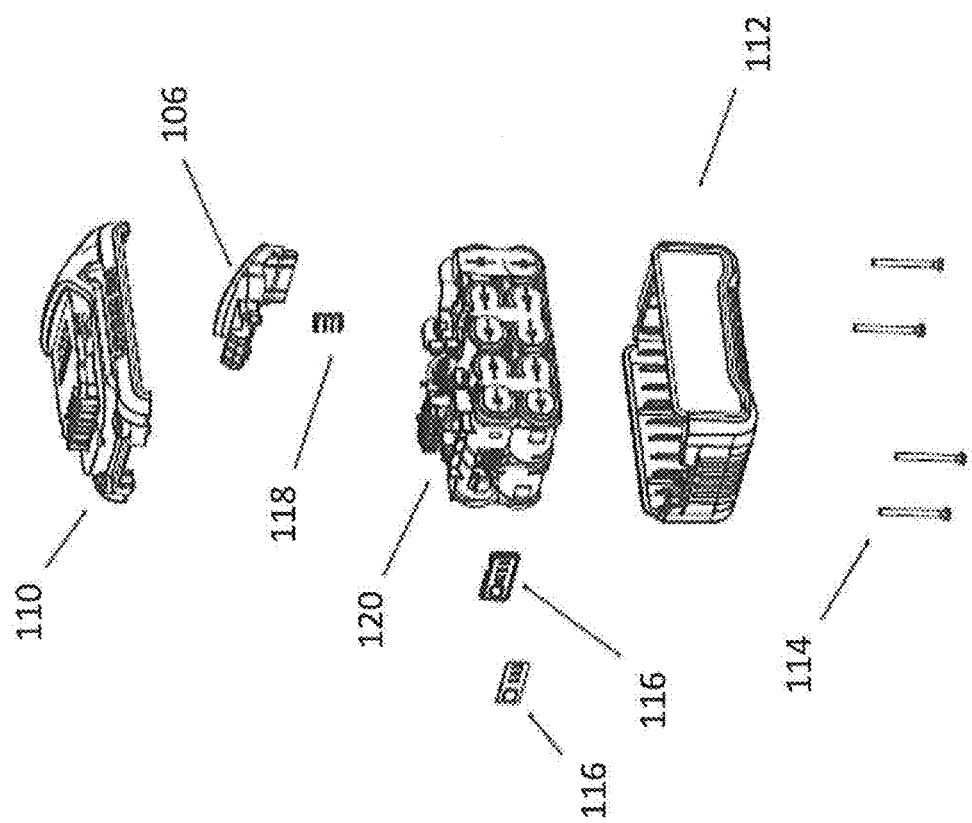
FIG. 2 is an exploded perspective view of the exemplary battery pack of FIG. 1.
Figures 4A, 4B, 4C:
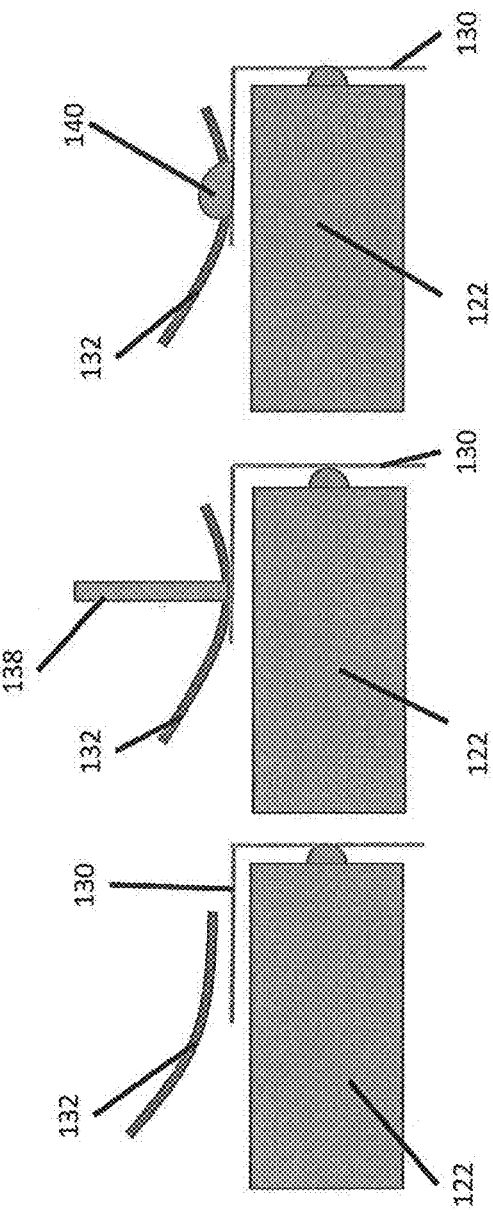
FIGS. 4A, 4B and 4C are views of a process for soldering the battery strap and lead wire of FIG. 3.
Figure 3:
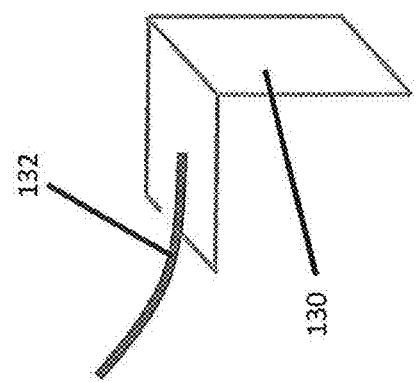
FIG. 3 is an isometric view of a convention battery strap and lead wire.

Referring to FIGS. 5A, 5B, 5C, and 5D (generally referred to collectively as FIG. 5), there is illustrated a first exemplary embodiment of a battery strap 200 BS1 of the present disclosure. This battery strap 200 BS1 is made of an electrically conductive material. The battery strap 200 BS1 may be formed by stamping the material into a predetermined shape and then bending the stamped material in to the shape illustrated in FIG. 5. The battery strap 200 BS1 includes a lead wire coupling portion 202, two cell (terminal) coupling portions 204 and an inter-terminal coupling portion 206. The cell coupling portion 204 electrically couples to a terminal (either positive or negative) of a battery cell 122, as described and illustrated in more detail below. The inter-terminal coupling portion 206 electrically couples the two cell coupling portions 204 and effectively electrically couples the terminals of two discrete battery cells 122. For example, the first cell coupling portion 204A may couple to a cathode (−) terminal A5− of a first battery cell 122A5 and the second cell coupling portion 204B may couple to a cathode (−) terminal B5− of a second battery cell 122B5 thereby effectively forming part of a parallel connection between the first and second battery cells 122A5, 122B5—the anode (+) terminals of the first and second battery cells 122A5, 122B5 would need to be electrically coupled by another battery strap 200BS3B to complete the parallel connection, as described below. The cell coupling portions 204A, 204B may be soldered or welded or otherwise fixedly coupled to the appropriate terminal.

The lead wire coupling portion 202 is configured to attach to the lead wire 208. As such, the battery strap 200BS1 serves to electrically connect the battery cells 122A5, 122B5 to the lead wire 208 (which is coupled to a battery pack terminal, for example BATT− terminal 216). The lead wire coupling portion 202 includes a plateau portion 210 which generally receives the lead wire 208. The plateau portion 210 may include a trough 212. The trough 212 (also considered a receptacle or valley) is generally a semi-circular cylindrical of a diameter approximately matching the gauge of the lead wire 208. The lead wire coupling portion 202 may also include a folded back portion 214 (also considered an overlap portion). The folded back portion 214 extends over at least part of the trough 212 providing a space between the folded back portion 214 and the trough 212 to place the lead wire 208. As such, when the lead wire 208 is placed in the trough 212 the lead wire 208 is between the folded back portion 214 and the trough 212 or plateau portion 210. The trough 212 allows the lead wire 208 to be seated therein. As such, when the lead wire 208 is soldered to the battery strap 200BS1 the lead wire 208 does not curl up, as in the conventional systems and may be fully covered by solder material and fixed to the battery strap 200BS1. The folded back portion 214 also assists to maintain the lead wire 208 in a seated position during soldering of the lead wire 208 to the battery strap 200BS1 and during operation of the battery pack 100. The folded back portion 214 may also provide additional electrically conductive material to solder to the lead wire 208. The battery strap 200BS1 may include the trough 212 and/or the folded back portion 214.

Referring to FIGS. 6A, 6B, 6C, and 6D (generally referred to collectively as FIG. 6), there is illustrated a second exemplary embodiment of a battery strap 300 BS2 of the present disclosure. The battery strap 300 BS2 illustrated in FIG. 6 is generally the same as the battery strap 200 BS1 illustrated in FIG. 5 except for the general configuration. More specifically, this battery strap 300 BS2 includes a lead wire coupling portion 302, a cell coupling portion 304 and an inter-terminal coupling portion 306. Furthermore, the lead wire coupling portion 302 includes a plateau portion 310 including a trough 312 and a folded back portion 314. This battery strap 300 BS2 is shaped differently than the battery strap 200 BS1 of FIG. 5 in part due to the configuration of the battery cells 122 in the core pack 120 and positioning of the lead wire 308 relative to the battery strap 300 BS2. In other respects, particularly the manner in which the lead wire 308 couples to the battery strap 300 BS2, the battery straps serve the same purpose and operate in the same manner.

Referring to FIGS. 7A, 7B, 7C, and 7D (generally referred to collectively as FIG. 7), there is illustrated a third exemplary embodiment of a battery strap 400 BS3 of the present disclosure. The battery strap 400 BS3 illustrated in FIG. 7 is generally the same as the battery straps 200 BS1, 300 BS2 illustrated in FIGS. 5 and 6 except for the general configuration. More specifically, this battery strap 400 BS3 includes a lead wire coupling portion 402, a cell coupling portion 404 and an inter-terminal coupling portion 406. However, the lead wire coupling portion 402 of this battery strap 400 BS3 is somewhat different than the lead wire coupling portion 202, 302 of the battery straps 200 BS1, 300 BS2 of FIGS. 5 and 6. As the lead wire 408 that connects to this type of battery strap 400 BS3 is somewhat different so it requires a different connection. For example, the lead wire 408 that will connect to this battery strap 400 BS3 is typically of a higher gauge wire and will connect the battery strap 400 BS3 to the printed circuit board 128. In this example, these battery straps 400 BS3 are used to connect nodes between cells 122 of a string of cells (intra-cell) to the PCB 128 to determine voltage levels of cells 122 within the string of cells. Again, in this example, the battery straps 200 BS1, 200 BS2 illustrated in FIGS. 5 and 6 are used to connect the ends of the strings of cells (the most positive or the most negative cell of the string of cells) to the battery pack terminals 216, 316 and/or to the PCB 128.

The lead wire coupling portion 402 of the battery strap 400 BS3 of FIG. 7 includes an eyelet 416 or cutout to receive and hold the lead wire 408. This allows the jig 138 of the assembly process to not include a feature to hold the lead wire 408 to the wire coupling portion 402 and results in a better solder connection between the lead wire 408 and the battery strap 200 BS3.

Referring to FIGS. 8A, 8B, 9A, 9B, 10A and 10B, there is illustrated an exemplary core pack 120 incorporating the exemplary battery straps 200 BS1, 300 BS2, 400 BS3 of FIGS. 5, 6, and 7. This exemplary core pack 120 includes a cell holder 124, a terminal block assembly 126, a PCB 128, a state of charge assembly 134, lead wires 208, 308, 408, and a ten (10) battery cells 122. The battery cells 122 are configured into two strings (A, B) of five cells. Each string of cells includes five (5) battery cells 122. Using the various battery straps, the battery cells within a string of cells are connected in series and the two strings of battery cells are connected in parallel. Furthermore, the strings of cells are connected such that there are inter-string connections between corresponding battery cells. In other words, for example, the anode (+) terminal of the A2 battery cell in the A string of cells is coupled to the anode (+) terminal of the B2 battery cell in the B string of cells. Furthermore, the anode (+) terminal of the A2 battery cell in the A string of cells is coupled to the cathode (−) terminal of the A1 battery cell in the A string of cells.

FIG. 8A illustrates the core pack 120 and the first exemplary battery strap 200 BS1 and two of the third exemplary battery straps 400 BS3C, 400 BS3D. In this example, the first exemplary battery strap 200 BS1 is attached to the cathode (−) terminal of the most negative battery cell A5, B5 in each string of cells A and B, one of the third exemplary battery straps 400 BS3C is attached to the anode (+) terminal of the A4 and B4 battery cells and the cathode (−) terminal of the A3 and B3 battery cells, and one of the third exemplary battery straps 400 BS3D is attached to the anode (+) terminal of the A2 and B2 battery cells and the cathode (−) terminal of the A1 and B1 battery cells (the most positive battery cells in each string). FIG. 8A also illustrates a lead wire 208 coupled to the first battery strap 200 BS1 and to the battery pack negative terminal BATT− 216 of the terminal block assembly 126.

FIG. 8B illustrates the core pack 120 and the second exemplary battery strap 300 BS2 and two of the third exemplary battery straps 400 BS3A, 400 BS3B. In this example, the second exemplary battery strap 300 BS2 is attached to the anode (+) terminal of the most positive battery cell A1, B1 in each string of cells A and B, one of the third exemplary battery straps 400 BS3A is attached to the cathode (−) terminal of the A2 and B2 battery cells and the anode (+) terminal of the A3 and B3 battery cells, and one of the third exemplary battery straps 400 BS3B is attached to the cathode (−) terminal of the A4 and B4 battery cells and the anode (+) terminal of the A5 and B5 battery cells (the most negative battery cells in each string). FIG. 8B also illustrates a lead wire 308 coupled to the second battery strap 300 BS2 and to the battery pack positive terminal BATT+ 316 of the terminal block assembly 126.

Figure 10B:
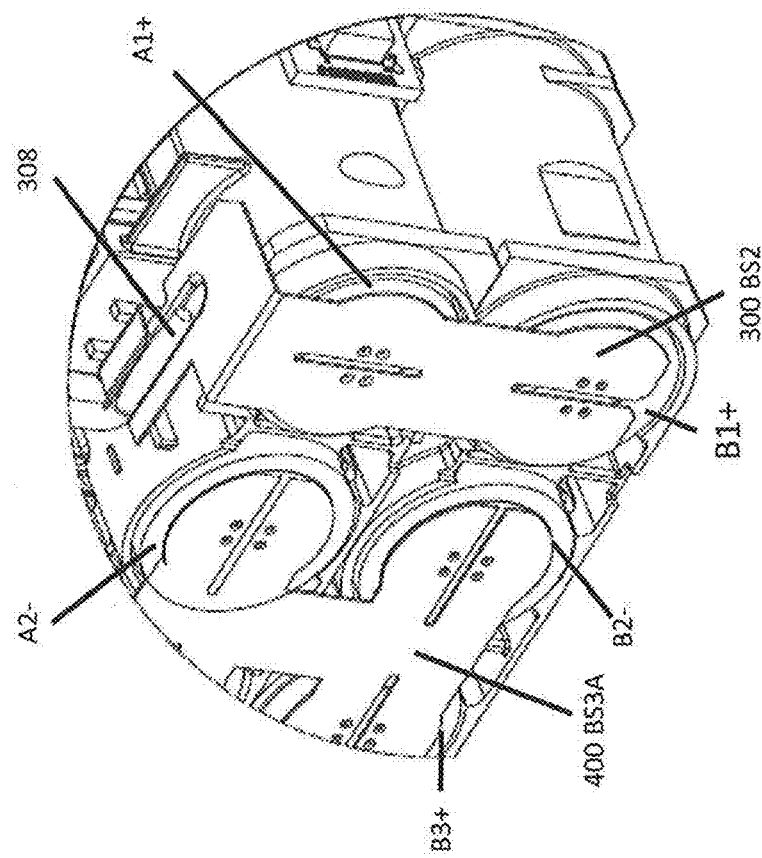
FIG. 10B is a partial, enlarged view of FIG. 8B.
Figure 10A:
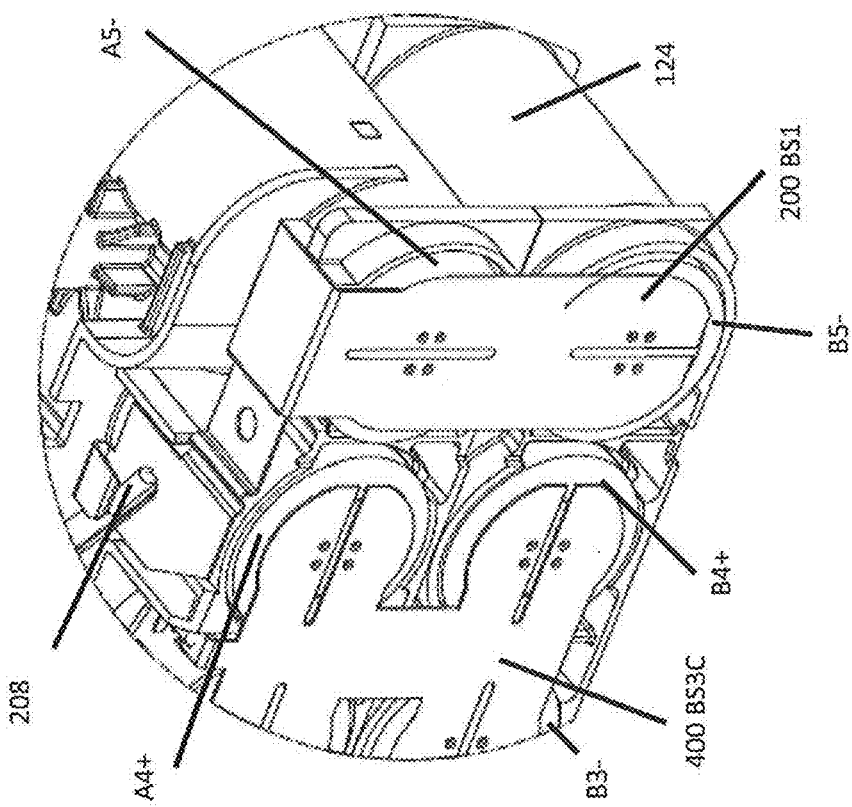
FIG. 10A is a partial, enlarged view of FIG. 8A
Figures 14A, 14B:
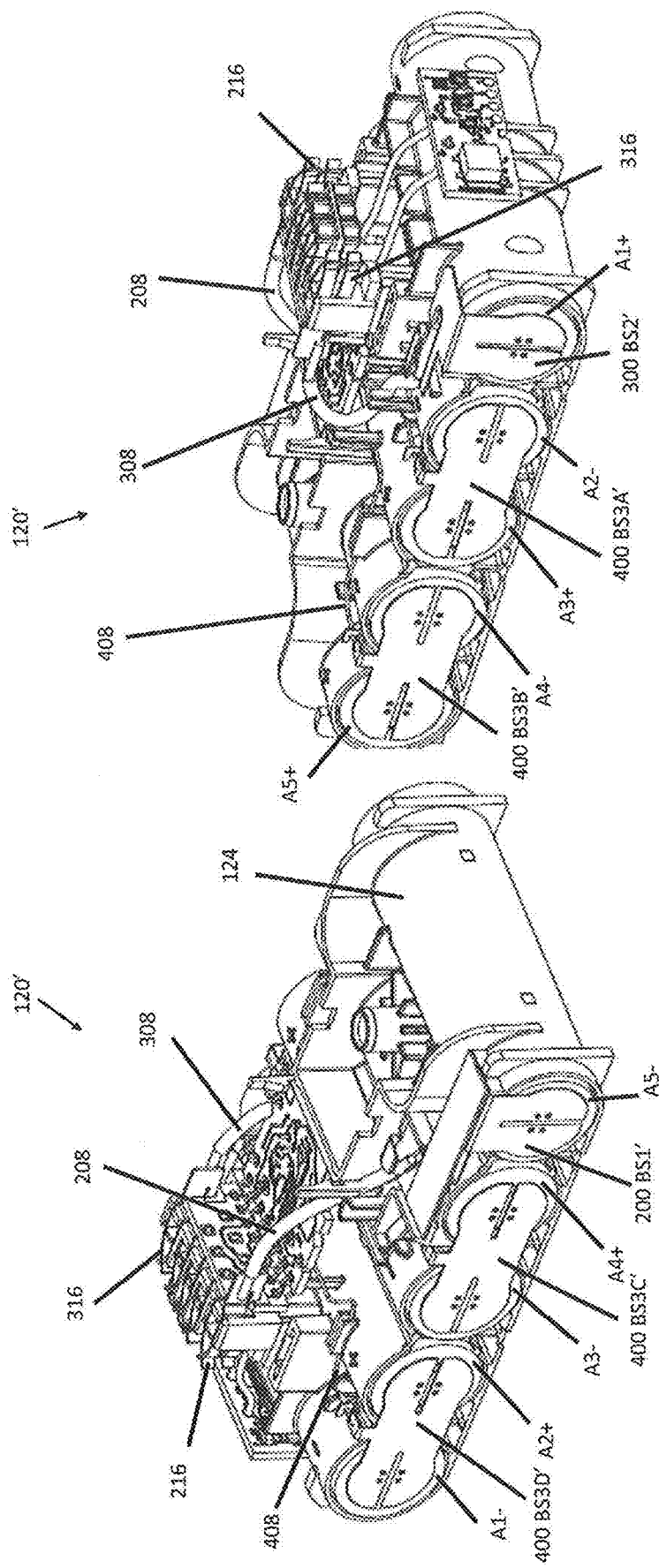
FIGS. 14A and 14B illustrate a second exemplary core pack of the battery pack of FIG. 1 including the fourth, fifth and sixth exemplary battery straps.

FIGS. 9A and 9B illustrate different views of the core pack 120 and the battery straps 200 BS1, 300 BS2, 400 BS3 of the present disclosure. FIGS. 10A and 10B illustrate enlarged views of portions of FIGS. 8A and 8B, respectively. As is illustrated in FIGS. 8-10, a lead wire 208/308 is placed in the trough 212/312 (also referred to as a valley) formed in the respective battery strap 200 BS1, 300 BS2. Furthermore, the lead wire 208/308 is sandwiched between the overlap portion 214/314 and the plateau portion 210/310 to hold the lead wire 208/308 in place during the soldering process.

During the core pack construction process, the various battery straps are temporarily attached to appropriate battery cells of the core pack. Then the various lead wires are temporarily placed in the appropriate position relative to the corresponding battery strap. With regard to the first and second battery straps 200 BS1, 300 BS2 the lead wires 208/308 are placed in the trough 212/312 between the overlap portion 214/314 and the plateau portion 210/310. With regard to the third battery straps 400 BS3A, 400 BS3B, 400 BS3C, 400 BS3D the lead wires 408 are placed in the eyelet 416 of the battery strap 400 BS3. Thereafter the core pack 120 is placed in a fixture for the soldering process. The solder guns (typically automated) solder the lead wires 208/308/408 to the battery straps 200 BS1/300 BS2/400 BS3. With regard to the first and second battery straps 200 BS1, 300 BS2 the solder forms over the overlap portion 214/314 and the lead wire 208/308 and preferably into at least a portion of the trough 212/312 and onto the plateau portion 210/310. This will provide a full and secure connection between the lead wire 208/308 and the battery strap 200 BS1/300 BS2. With regard to the third battery straps 400 BS3A, 400 BS3B, 400 BS3C, 400 BS3D the solder forms over the lead wire 408 and the eyelet 416.

FIGS. 11-15 illustrate additional exemplary embodiments of battery straps 200 BS1', 300 BS2', 400 BS3' and an additional exemplary core pack 120' incorporating the additional battery straps. The difference between the exemplary battery straps of the FIGS. 11-15 and FIGS. 5-10 is that the battery straps of FIGS. 11-15 are for a battery pack 100' having a single string of battery cells—five (5) battery cells in this example—while the battery straps of FIGS. 5-10 are for a battery pack 100 having two strings of battery cells—five (5) cells in this example. The lead wire connection features described above with respect to FIGS. 5-10 are also found in the battery straps illustrated in FIGS. 11-15.

Figure 16:
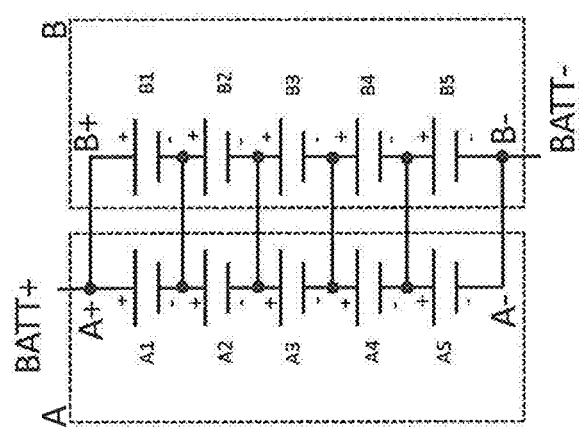
FIG. 16 is a simplified schematic of the battery cells of the exemplary battery pack of FIG. 1.

FIG. 16 illustrates a simplified circuit diagram of the battery cells of the exemplary core pack 120 of FIGS. 8-10. This exemplary set of battery cells includes a first subset A of battery cells 122 and a second subset B of battery cells 122. The first subset A includes five (5) battery cells A1, A2, A3, A4, A5 connected in series presenting a positive node A+ and a negative node A− and the second subset B includes five (5) battery cells B1, B2, B3, B4, B5 connected in series presenting a positive node B+ and a negative node B−. The first subset A and the second subset B are connected in parallel. More particularly, the subset A positive node A+ is connected to the subset B positive node B+ and the subset A negative node A− is connected to the subset B negative node B−. Furthermore, there are inter-set connections between nodes found between cells connected within a subset of cells. For example, a node between the A1 battery cell and the A2 battery cell is connected to a node between the B1 battery cell and the B2 battery cell. All of these connections are made using the battery straps, as described above.

Numerous modifications may be made to the exemplary implementations described above. These and other implementations are within the scope of this application.

The present disclosure presents an electrical connector comprising a wire coupling portion, the wire coupling portion including a generally flat, plateau portion wherein the plateau portion includes a trough. The electrical connector wherein the trough is generally semi-cylindrical. The electrical connector further comprises an overlap portion that is positioned generally parallel to the plateau portion. The electrical connector wherein the overlap portion is positioned generally adjacent to an open side of the trough. The electrical connector further comprising an electrical device coupling portion at an end of the electrical connector opposite to the wire coupling portion.

The present disclosure presents a method for assembling a battery pack comprising providing a plurality of battery cells in a cell holder, mounting a terminal block and printed circuit board on the cell holder, coupling at least one battery strap to the plurality of battery cells wherein the at least one battery strap includes a trough at a lead wire coupling portion of the battery strap, positioning a lead wire in the trough, and soldering the lead wire in the trough to the battery strap. The method for assembling a battery pack further comprising providing an overlap member at the lead wire coupling portion of the battery strap and positioning the overlap portion adjacent to the trough in a manner such that the lead wire is positioned between the trough and the overlap portion. The method of assembling a battery pack wherein the solder connection couples the overlap portion to the lead wire.

Numerous modifications may be made to the exemplary implementations described above. These and other implementations are within the scope of this application.

The invention claimed is:

1. A battery pack comprising:
   a battery strap for coupling a battery cell to a battery pack terminal, the battery strap comprising a lead wire connecting portion including a plateau portion having a first surface and a second surface opposed to the first surface and a trough formed in the first surface and an overlap portion adjacent to the plateau portion forming a space between the plateau portion, the trough and the overlap portion to receive a lead wire, wherein the trough extends beyond the overlap portion; and
   a lead wire received in the trough, at least a portion of the lead wire positioned between the overlap portion and the trough.
2. The battery pack, as recited in claim 1, wherein the trough has a shape to receive a lead wire.
3. The battery pack, as recited in claim 2, wherein the trough shape is semi-cylindrical.
4. The battery pack, as recited in claim 1, wherein the overlap portion is generally parallel to the plateau portion.
5. The battery pack, as recited in claim 1, further comprising a battery cell coupling portion generally perpendicular to the plateau portion.

* * * * *